Dec. 10, 1968     J. W. GILBAUGH     3,415,006
SELF-SETTING, REPEATING ANIMAL TRAP
Filed Sept. 16, 1965     2 Sheets-Sheet 1
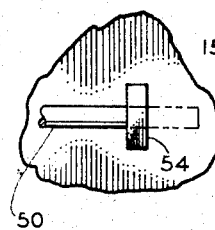
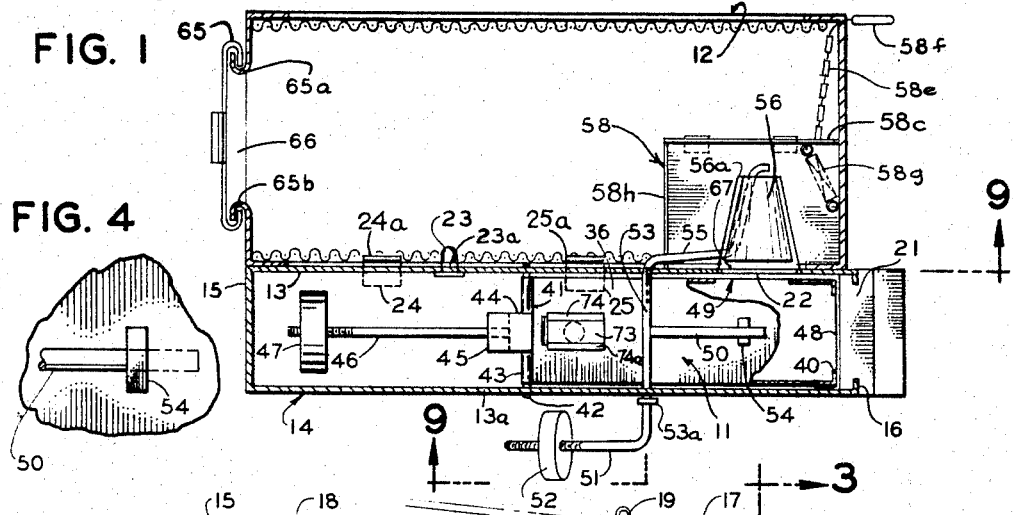
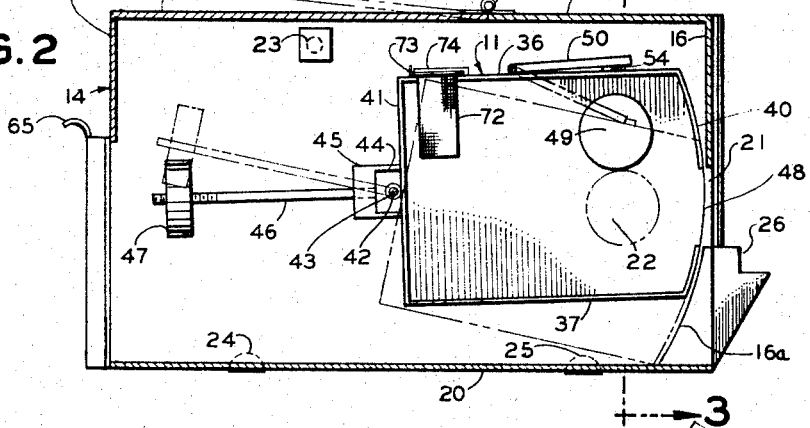
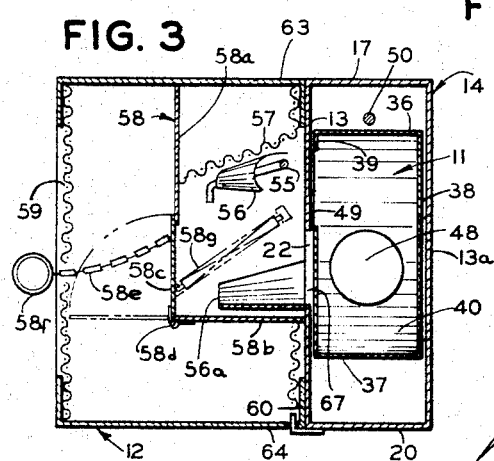
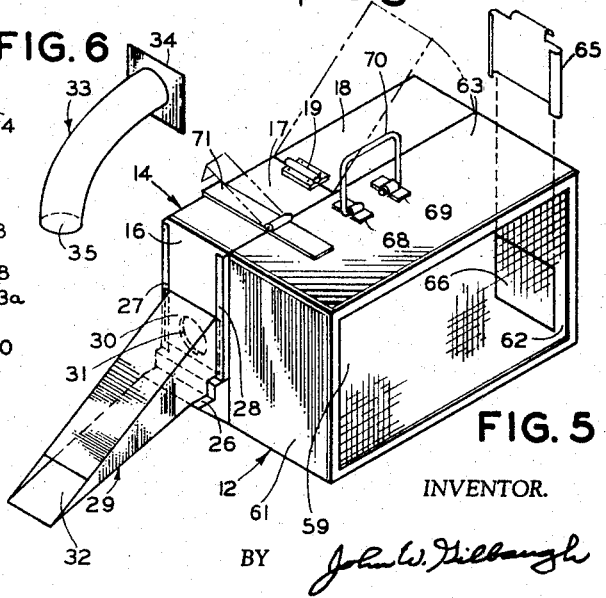
INVENTOR.
BY John W. Gilbaugh Dec. 10, 1968  J. W. GILBAUGH  3,415,006
SELF-SETTING, REPEATING ANIMAL TRAP
Filed Sept. 16, 1965  2 Sheets-Sheet 2

INVENTOR.
John W. Gilbaugh
BY

United States Patent Office 3,415,006
Patented Dec. 10, 1968

3,415,006
SELF-SETTING, REPEATING ANIMAL TRAP
John W. Gilbaugh, 19396 Monte Vista,
Saratoga, Calif. 95070
Filed Sept. 16, 1965, Ser. No. 487,733
10 Claims. (Cl. 43—67)

ABSTRACT OF THE DISCLOSURE

A counter-balanced trapping compartment is pivotally mounted in a casing and has a front entrance opening adapted to be aligned and misaligned with an opening in the casing. A side exit opening in the compartment is adapted to be aligned with a side opening in the casing when the front openings are misaligned. A latch member releasably secures the compartment in the position in which the front entrance openings are misaligned. A detachable receiving cage is secured to the casing adjacent the side exit opening. A counter-balanced, animal operated latch releasing member is positioned exteriorly of the compartment exit opening.

---

This invention relates to improvements in repeating, self-setting animal traps in general. More specifically, this invention relates to repeating, self-setting, animal traps constructed for catching animals and birds ranging in size from mice and sparrows to rabbits and pigeons.

An object of the invention is to provide an improved trap with means to capture alive and unharmed a bird or animal and to automatically reset itself in position for catching additional victims, thus permitting the trapping of several birds or animals without needed attention by the user.

Still another object of the invention is to provide an improved trap with a trapping compartment and an attached, removable cage which holds captive the victims; said cage being constructed for easy detachment from the trapping compartment to facilitate removal of the trapped animals or birds alive and unharmed.

Another object of this invention is to provide an improved trap of simple construction and capable of easy disassembly, thus providing for a necessary sanitary feature, and for ease in disposing of the victims trapped.

Still another object of this invention is to provide an improved, self-setting, repeating animal trap, resistant to wear, and simple in construction, features attractive from the standpoint of manufacture and sale thereof.

Still another object of this invention is to provide an improved, repeating, self-setting trap with a novel mechanism which locks the trapping compartment in a closed position to prevent escape of the victim imprisoned therein, and which easily and readily releases the trapping compartment from its locked position, resetting it for the next animal, as the victim moves into the attached receiving-carrying cage where it is imprisoned without possibility of return to the trapping compartment.

Another object of this invention is to provide an improved, repeating, self-setting trap with suitable attachments which may be easily attached or detached for use in catching animals and birds by attracting them and providing easy access to the trapping compartment.

Still another object of this invention is to provide an improved, repeating, self-setting animal trap with a trapping compartment which is activated by the weight of the animal, simultaneously closing the access route to the trapping compartment behind him and opening an exit from said compartment which leads to the receiving-carrying cage.

Still another object of this invention is to provide an improved, repeating, self-setting trap with adjustable means to regulate the sensitivity of operation of the trapping compartment and locking-releasing mechanisms.

Other and further objects and advantages of this invention will be apparent to those skilled in the art to which it relates from the following specification, claims and drawing in which, briefly:

FIG. 1 is a horizontal sectional view taken beneath the top wall of the embodiment of this invention;

FIG. 2 is a longitudinal vertical sectional view of the trapping compartment and casing of this invention;

FIG. 3 is a transverse vertical sectional view taken along line 3—3 of FIG. 2;

FIG. 4 is a perspective view, on an enlarged scale, of the latch pin and latch pin stop;

FIG. 5 is a perspective view of the self-setting, repeating animal trap with accessory entrance ramp and carrying-removal cage attached;

FIG. 6 is a perspective view of the flexible tube entrance attachment accessory;

Figure 7:
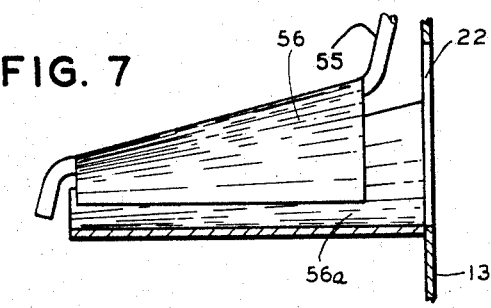
FIG. 7 is a partial sectional view on an enlarged scale of the lock releasing assembly shown in FIG. 3.

Referring to the drawings in detail, the invention is comprised of three basic parts which after being assembled as described hereinafter, cooperate to entrap and inprison birds and animals without harm or injury and without possibility of escape. The basic parts include a trapping compartment designated by the numeral 11, an elongated box-like casing 14 in which the trapping compartment 11 is pivotally mounted, and a receiving-carrying cage 12.

The casing 14 of elongated box-like configuration has side members 13 and 13a, a back end wall 15, a front end wall 16, a top 17, and a bottom 20. In constructing the casing 14 the side walls 13 and 13a, the top 17 and bottom 20 may be formed of sheet metal, wood or plastic as desired. The door 18 constructed of material to match the casing 14 is attached by a hinge 19 to top member 17 of the casing 14. Door 18 serves to complete the rectangular enclosure of casing 14 and to serve as an access door to service the parts encompassed therein. The vertical arc shield 16a is fixedly attached to the interior of the casing 14 with one end fixedly fastened to the front end wall 16 immediately below the lower limits of the entrance opening 21 and the other end fixedly attached to the bottom 20 near the front of casing 14. The casing 14 has an entrance opening 21 of round configuration located substantially in the center of front end wall 16 and an exit opening 22 also of circular configuration located in the front central portion of sidewall 13. Casing 14 is equipped with a two-step perch 26 as shown in FIG. 2 which is fixedly mounted to the front end wall 16 with the upper step extending outwardly at a right angle from the lower limits of entrance opening 21 with the second step of the two-step entrance perch 26 situated downwardly parallel with the upper step and at a greater distance away from front end wall 16 of casing 14. The two-step perch 26 is designed primarily for use in capturing birds with this invention. The perch 26 is constructed of material from which casing 14 is built.

This trap is also provided with two entrance attachment accessories, an enclosed ramp 29 as shown in FIG. 5 which is slidably mounted by guides 27 and 28 which are fixedly attached vertically to the front extremities of side walls 13 and 13a of casing 14 and bent inwardly at right angles to parallel vertically the front end wall 16. Entrance ramp 29 has an entrance opening 32 at one end which extends upwardly from the same level as bottom 20 of casing 14 to the two-step perch 26. Entrance ramp 29 is equipped with a plate 30 fixedly mounted at one end which extends beyond the sidewalls of ramp 29. The portion of the plate 30 which extends beyond the sidewalls of entrance ramp 29 cooperates with guides 27 and 28 to slidably mount entrance ramp 29 to casing 14. Plate 30 of detachable entrance ramp 29 has a hole 31 in the center thereof for the victim to pass through in gaining entrance to the trapping compartment 11. The ramp plate hole 31 is of the same size as the entrance opening 21 in casing 14 and the hole 31 in ramp plate 30 registers with entrance opening 21 in casing 14 when entrance ramp 29 is detachably and slidably mounted to casing 14. The entrance ramp 29 may be constructed of wood, metal, or plastic and would normally match the material from which the casing 14 is constructed.

A second entrance attachment with which this trap is equipped is a flexible tube 33 as shown in FIG. 6. The flexible tube attachment 33 has an entrance opening 35 at one end and a metal plate 34 at the opposite end. The plate 34 has a hole in the center thereof which registers with entrance opening 21 in casing 14 when the plate 34 is detachably and slidably mounted to casing 14 and held in place by guides 27 and 28. The inside diameter of the flexible tube entrance 35 and the hole in plate 34 should be at least as large as the entrance opening 21 in casing 14. The flexible tube attachment 33 may be made of metal, plastic or rubber or a combination thereof as desired.

Figure 10:
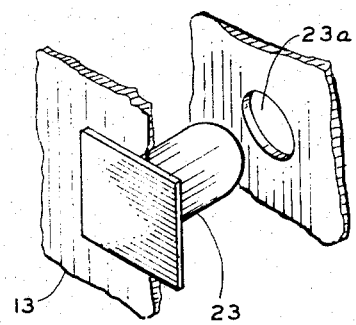
FIG. 10 is a perspective view, on an enlarged scale, of the pin and pin hole located on the upper central, adjacent side walls of casing and carrying removal cage respectively.

Casing 14 is equipped with a pin 23 fixedly attached to the upper central portion of side wall 13 and a matching hole 23a in side wall 60 of carrying-receiving cage 12 as shown in FIGS. 1, 2 and 10 to stabilize casing 14 and carrying-receiving cage 12 when the two units are removably locked together. Casing 14 also has fixedly mounted to the bottom 20 two strap metal hooks 24 and 25 which project outwardly from side wall 13 and turn upwardly at right angles to form hooks. Hooks 24 and 25 are fixedly attached near opposite ends of the bottom 20 of casing 14 and are received into matching elongated openings 24a and 25a in the bottom 64 of carrying-receiving cage 12 near side wall 60 thereof. To complete removable attachment of casing 14 to carrying-removal cage 12 a strap-hinge hook 71 is fixedly attached to the top 63 of carrying receiving cage 12 near the front end wall 61, thereof and extends outwardly and hingedly across the top 17 of casing 14 and then turns downwardly at a right angle along side wall 13a to provide clamping means to securely and removably lock casing 14 and receiving-carrying cage 12 together.

The trapping compartment as shown in FIG. 2 and generally designated by the numeral 11 is pivotally mounted in the casing 14 and has a top 36, a bottom 37, side walls 38 and 39, a front end wall 40 and a back end wall 41. The trapping compartment 11 is pivotally mounted by the pivot shaft 42 which is held in place by a sleeve 43 that is fixedly and horizontally attached to the center of the back end wall 41 of trapping compartment 11. The ends of the pivot shaft 42 are held in place by openings which receive them approximately in the centers of side wall 13 and 13a of casing 14. Trapping compartment 11 is maintained in its horizontally balanced position when it is set to receive a victim by a counter-balance assembly which consists of a counter-balance pin attachment holder 44 fixedly attached to the center of back end wall 41 of trapping compartment 11, a counter-balance arm brace 45 also fixedly attached to the central area of back end wall 41 of trapping compartment 11 to stabilize the threaded counter-balance arm 46 which in turn supports the adjustably mounted counter-balance 47. The counter-balance assembly described above extends outwardly at a right angle from the back end wall 41 of the trapping compartment 11. The front end wall 40 of trapping compartment 11 is of vertical arc configuration and cooperates with the vertical arc shield 16a fixedly mounted in the front portion of casing 14 when the trapping compartment 11 is activated and moves downwardly by the weight of a victim. Front end wall 40 of trapping compartment 11 has an entrance opening 48 in the central portion thereof which registers with the front end wall opening 21 in casing 14 when trapping compartment 11 is in its horizontally set position. As the trapping compartment 11 is activated by the weight of an animal entering therein entrance opening 48 in front end wall 40 moves downwardly behind vertical arc shield 16a in the front portion of casing 14 to cooperate in closing entrance opening 48 and prevent the escape of the victim entrapped therein. When the trapping compartment is in its downward position an exit opening 49 in side wall 39 of trapping compartment 11 registers with the exit opening 22 in side wall 13 of casing 14 and permits the victim to move into the receiving-carrying cage 12. The trapping compartment 11 is made of sheet metal, plastic, or other material as desired and will normally match the type of material used in construction of the casing 14.

Casing 14 is equipped with a locking-releasing assembly as shown in FIG. 1 comprising a latch pin 50 which is fixedly attached at one end to the center at a right angle to pivot shaft 53 which extends outwardly through openings in side walls 13 and 13a of casing 14, a threaded arm 51 which continues as part of pivot shaft 53 and which passes through the opening in casing side wall 13a continuing downwardly at a half right angle toward the back end wall 15 of casing 14, a counter-balance weight 52 adjustably mounted to threaded arm 51, a collar 53a fixedly attached to pivot shaft 53 immediately outside casing side wall 13a to prevent horizontal movement of pivot shaft 53 and attachments fixedly appended thereto, a latch-pin stop 54 fixedly mounted to the front central portion of the top 36 of traping compartment 11 which moves with trapping compartment 11 as the latter pivots downwardly from the weight of an entering victim and the locking-releasing assembly is activated with latch pin 50 which rests on latch pin stop 54 when trapping compartment 11 is in its horizontally set position cooperates by moving downwardly and dropping behind latch-pin stop 54 to removably lock trapping compartment 11 in its downwardly pivoted position so that exit opening 49 in side wall 39 of trapping compartment 11 registers with opening 22 in side wall 13 of casing 14, another arm 55 fixedly attached to the other end of pivot shaft 53 which extends through the opening in side wall 13 of casing 14, a funnel-shaped projection 56 made of sheet metal or wire mesh is fixedly attached horizontally to arm 55 and cooperates with the bottom half of the funnel-shaped projection 56a to provide a lock releasing means by an animal passing from trapping compartment 11 through the registered exit openings of 49 in side wall 39 of trapping compartment 11 and 22 in side wall 13 of casing 14 raising the funnel-shaped projection 56 activating upwardly lock assembly arm 55 and pivotally rotating pivot shaft 53 so that latch-pin 50 is raised upwardly from behind the metal and perpendicularly mounted latch pin stop 54 fixedly attached to the front central portion of top 36 of trapping compartment 11 unlocking the trapping compartment 11 from its downwardly locked position when the trapping compartment 11 has a victim imprisoned therein. Latch-pin stop 54 is vertically mounted as previously indicated on the front central portion of top 36 of trapping compartment 11 at a height approximately equivalent to the thickness of latch-pin 50 with a width of approximately one-half inch. Pivot shaft 53 is pivotally mounted in openings in side walls 13 and 13a in casing 14 and in front of the slidable door 73 of bait holder 72 fixedly attached in trapping compartment 11, at a level in casing 14 so that pivot shaft 53 also serves to stabilize the pivotally mounted trapping compartment 11 from moving upwardly above its proper horizontal position when it is set to receive a victim without interfering with the downwardly pivoting action of trapping compartment 11 when a victim enters therein.

After a victim is captured and imprisoned in trapping compartment 11 of this invention it must be removed therefrom, so another important feature of this invention is provided—a receiving-carrying cage designated generally by the numeral 12. The receiving-carrying cage 12 of elongated configuration is made of sheet metal with wire mesh sides 59 and 60 and metal or plastic front end wall 61, back end wall 62, top 63 and bottom 64. Back end wall 62 of receiving-carrying cage 12 has a door 65 slidably mounted in guides 65a and 65b which are vertically and fixedly attached to back end wall 62 near side walls 59 and 60. The opening 66 in back end wall 62 of receiving-carrying cage 12 extends from the lower extremities of back end wall 62 upwardly to slightly above the center of back end wall 62 and outwardly to guides 65a and 65b. Slidably mounted door 65 provides access to receiving-carrying cage 12 and provides a means for removing victims imprisoned therein. Receiving-carrying cage 12 has an entrance opening 67 in side wall 60 which registers with opening 22 in side wall 13 of casing 14 to provide passage for a victim from the trapping compartment 11 when it is in its downwardly pivoted position. Around the entrance opening 67 and fixedly attached to side wall 60 and to the adjacent area of front end wall 61 and to the adjacent top area is a small rectangular inner cage generally designated by the numeral 58 as shown in FIGS. 1 and 3. The rectangular inner cage provides a means of closing entrance opening 67 in side wall 60 of receiving-carrying cage 12 to prevent escape of victims imprisoned therein when receiving-carrying cage 12 is separated from casing 14 to dispose of victims. The inner rectangular cage 58 has a front wall 58a extending downwardly from the underside of top 63 along front end wall 61 of receiving-carrying cage 12, a floor 58b which is fixedly attached to side wall 60 at the lower extremities of entrance opening 67 of receiving-carrying cage 12 and to the bottom of side wall 58h of inner cage 58 in receiving-carrying cage 12, a hinged mounted door 58c attached to hinge 58d which is fixedly mounted to the edge of the floor 58b situated near the front central portion of receiving-carrying cage 12. Front end wall 58a of the inner-rectangular cage 58 cooperates with hingedly mounted door 58c in closing or opening access by victim to the receiving-carrying cage 12. Side wall 58h of the inner rectangular cage 58 fixedly secured to the underside of top 63 of receiving-carrying cage 12 and to front end wall 58a and floor 58b completes the elongated-rectangular enclosure represented by the inner cage designated by the numeral 58, with the top 63 of receiving-carrying cage 12 serving in common as a top to the inner cage 58 and the front end wall 61 of receiving-carrying cage 12 serving in common as a side wall for inner cage 58. The door 58c of inner cage 58 is held in its closed position as shown in FIGS. 1 and 3 by a spring 58g with one end fixedly attached slightly below the center of the edge nearest front end wall 61 of receiving-carrying cage 12 and the other end extending into inner cage 58 inwardly and upwardly at approximately a half right angle along front end wall 61 of receiving-carrying cage 12 where it is fixedly attached. The door 58c has a small chain 58e as shown in FIGS. 1 and 3 fixedly attached thereto directly above the point and on the same edge to which one end of spring 58g is fixedly attached and which extends outwardly through a keyhole opening below the center of the front frame member of side wall 59 of receiving-carrying cage 12. Chain 58e has a ring 58f attached to the end which extends through and outwardly from the keyhole opening in front frame member of side wall 59 to prevent the end of chain from slipping into the receiving-carrying cage 12 and to also provide a means for pulling chain 58e to open door which is held open by any link in chain 58e in narrow portion of keyhole through which it passes in the frame member of side wall 59 of receiving-carrying cage 12. Door 58c is held by chain 58e in open position when receiving-carrying cage 12 is in use for receiving victims from trapping compartment 11.

Receiving-carrying cage 12 is also equipped with a handle 70 pivotally mounted in housings 68 and 69 which are fixedly mounted to the top 63 thereof. Locking hinge 71 previously described is also fixedly attached to top 63 of receiving-carrying cage 12 and hingedly extends across the top 17 of casing 14 turning downwardly at a right angle along side wall 13a of casing 14 to removably lock casing 14 to receiving-carrying cage 12.

Figure 9:
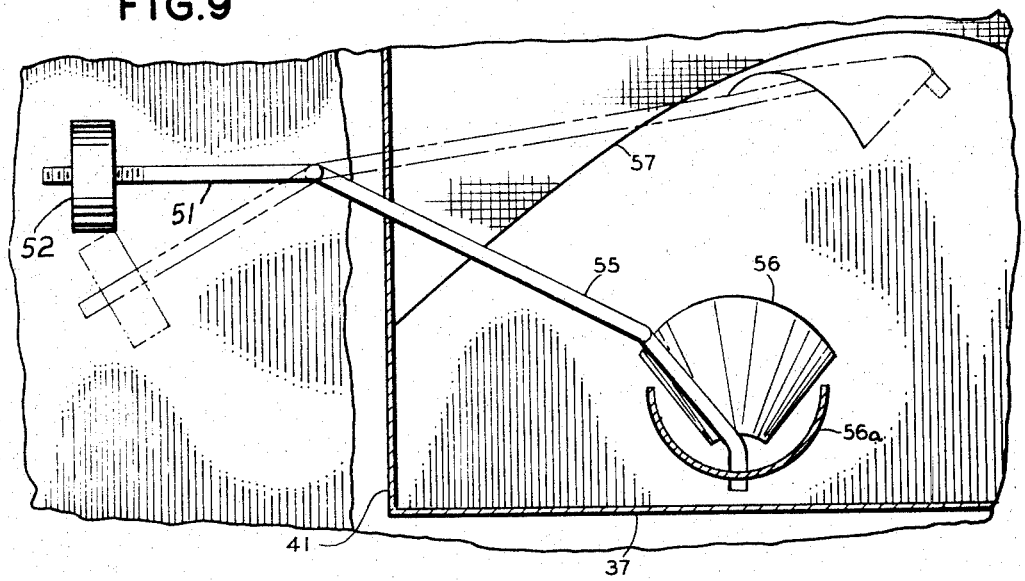
FIG. 9 is a partial side elevation view and a partial sectional view on an enlarged scale of the lock-releasing assembly taken along line 9—9 of FIG. 1.

The elongated rectangular inner cage 58 has a wire mesh or sheet metal guard 57 horizontally and fixedly attached to upper side wall 58h thereof and to that portion of upper frame member of side wall 60 and to adjacent front end wall 61 of receiving-carrying cage 12 as shown in FIGS. 3 and 9 which serve as common walls within inner cage 58. The guard 57 has a configuration which matches the configuration of the lock-releasing funnel-shaped projection 56 and receives funnel-shaped projection 56 and the arm 55 to which it is attached when these two units are in their upwardly pivoted horizontal position. Guard 57 prevents victims imprisoned in receiving-carrying cage 12 from climbing onto the lock-releasing funnel-shaped projection 56 or arm 55 to which it is attached when in their upwardly pivoted positions and activating the closing of trapping compartment 11 without a victim imprisoned therein.

Figure 8:
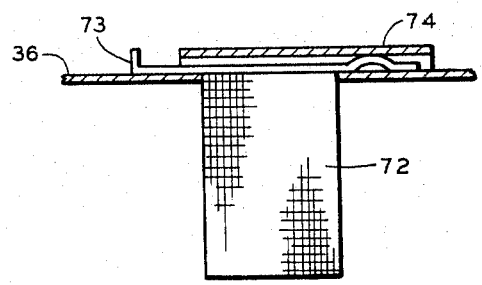
FIG. 8 is a sectional view on an enlarged scale of the bait holder with sliding door shown in FIG. 2.

Trapping compartment 11 is equipped with a bait holder 72 made of wire mesh which is fixedly attached to the underside of top 36 of trapping compartment 11 extending downwardly for several inches as shown in FIGS. 1, 2 and 8. Bait holder 72 may be cylindrical or rectangular as desired and large enough to hold as bait a live mouse or small bird or inserts as needed. The bait holder 72 is fixedly mounted to the rear central portion of top 36 inside trapping compartment 11 near the rear bank wall 41. To prevent the escape of live bait the holder 72 is provided with a slidable door 73 which is slidably held in place by guides 74 and 74a fixedly mounted to the top 36 of trapping compartment 11 along the sides of the entrance to bait holder 72 parallel to the sides 38 and 39 of trapping compartment 11.

What I claim is:

1. An animal trap comprising a box-like casing having side walls, end walls, top, bottom, and a service door hingedly mounted to said top and extending substantially from the center of said casing to the back end wall, an entrance opening substantially in the center of the front end wall, an exit opening in one side wall substantially in the front central portion thereof, a shield of vertical arc configuration fixedly mounted inside said casing and extending from the lower limits of said entrance opening in said front end wall downwardly to said bottom of said casing, a trapping compartment having side walls, end walls, top, bottom, bait holding means, and counter-balancing means, said trapping compartment being pivotally mounted in said box-like casing to move in a vertical arc, said front end wall of said trapping compartment having a convex configuration with an entrance opening substantially in the center thereof, said entrance opening in said trapping compartment normally registering with said front end wall entrance opening in said casing when said trapping compartment is in its horizontally set position, an exit opening in one side wall of said trapping compartment substantially in the upper front portion thereof, which is brought into register with said sidewall exit opening in said casing when pivotal movement of said trapping compartment is activated by the weight of an entering victim, said front end wall entrance opening in said trapping compartment being simultaneously closed as said trapping compartment pivots downwardly in said vertical arc and the convex configuration of said front end wall of said trapping compartment cooperates with said shield of vertical arc configuration to block escape of victim through said trapping compartment entrance, a latch means to hold said trapping compartment in its lowered position, and a latch releasing means activated by victim as said victim leaves said trapping compartment through said exit opening in said side wall of said trapping compartment which registers with said exit opening in said side wall of said casing when said trapping compartment is in said lowered position, said counter-balancing means on said trapping compartment being adapted to return said trapping compartment to its normal horizontally set position when victim leaves said trapping compartment and said exit opening in said trapping compartment moves out of register with said exit opening in said casing blocking possible re-entry of victim into said trapping compartment, a combination receiving-carrying cage removably and laterally mounted to said casing, means on said receiving-carrying cage which permits the victim to enter said cage without possibility of re-entry into the trapping compartment.

2. An animal trap as set forth in claim 1 further characterized in that said bait holding means is made of wire mesh and is fixedly mounted to the underside of said top of said trapping compartment in near proximity to said back end wall of said trapping compartment, said bait holder being equipped with a slidable door covering an access opening through the rear central portion of said top of said trapping compartment.

3. An animal trap as set forth in claim 1 further characterized in that said counter-balancing means has a threaded weight adjustably mounted on a threaded rod, said rod being fixedly attached substantially to the central portion of the outside surface of said back end wall of said trapping compartment, said threaded rod extending away from said back end wall of said trapping compartment at approximately a right angle, said counter-balancing means with said threaded weight adjustably mounted on said threaded rod provides means for adjusting said trapping compartment to proper balance on said pivot means when variable weighted baits are used in said bait holding means.

4. An animal trap as set forth in claim 1 further comprising a fixedly mounted horizontal platform on said front end wall of said casing at the level of the lower limits of said entrance opening of said casing, said platform being comprised of a two-stop level design in such manner that the upper step constitutes a barrier over which victim must climb or jump to gain access to said trapping compartment through said entrance opening in said front end wall of said casing and said entrance opening in front end wall of said trapping compartment.

5. An animal trap as set forth in claim 1 further comprising a slidably and removably mounted ramp on said front end wall of said casing, said ramp being enclosed with sides, top and bottom and open at both ends, one end of said ramp including a plate, said plate having an opening at least equal in size to said entrance opening in said front end wall of said casing, said plate being removably attached to said front end wall of said casing by guides fixedly mounted on the front ends of said side walls of said casing, said guides providing means for slidably and removably attached said ramp to said casing so that said opening in said ramp plate, said entrance opening in said front end wall of said casing and said entrance opening in said trapping compartment all register when said trapping compartment is in said horizontally set position.

6. An animal trap as set forth in claim 1 further comprising an accessory flexible tube slidably mountable on said front end wall of said casing, said flexible tube being open at each end, one end of said flexible tube being mounted on a plate, said plate having an opening at least equal in size to said entrance opening in said front end wall of said casing, said plate being removably attached to said front end wall of said casing by guides fixedly mounted on the front ends of said side walls of said casing, said guides providing means for slidably and removably attaching said flexible tube to said casing so that said opening in said flexible tube and said entrance opening in said front end wall of said casing and said entrance opening in said trapping compartment register when said trapping compartment is in said horizontally set position.

7. An animal trap as set forth in claim 1 further characterized in that said latch means is horizontally and pivotally mounted substantially in the upper central portion of said side walls of said casing, said latch means consisting of a pin which extends forwardly lengthwise from its pivotal means to which it is fixedly mounted, and a stop member fixedly mounted on the front center portion of said top of said trapping compartment, said pin being fixedly attached to said pivotal means midway between said side walls of said casing and above said top of said trapping compartment in front of said opening in said bait holding means, said pin resting on said stop member when said trapping compartment is in its said horizontally set position, said pin moves downwardly in a vertical arc and drops behind said stop member thus locking said trapping compartment in its lowered position when said trapping compartment is activated by an animal which enters therein.

8. An animal trap as set forth in claim 7 further characterized in that said latch releasing means includes an arm fixedly attached at one end to one end of said pivot means for said latch pin, said arm has fixedly attached at its other end the top half of a funnel-shaped projection mounted substantially in a horizontal manner, the bottom half of said funnel-shaped projection is fixedly mounted below the lower limits of said exit opening in said side wall of said casing so that a complete funnel-shaped extension of said exit opening in said side wall of said casing is formed when said trapping compartment is locked closed by said latch means, said latch releasing means is activated by an animal passing through said exit openings in said trapping compartment and said side wall of said casing by applying slight pressure to said top half of said funnel-shaped projection causing said arm to pivot upwardly thus releasing said latch pin from behind said latch stop, said latch pin, said arm on said latch releasing means and said trapping compartment are in substantially horizontal poistions when said trap is in said set position, and said latch pin, said arm on said latch releasing means and said trapping compartment move downwardly in a simultaneous manner when said trapping compartment is activated by a victim entering therein, said latch releasing means is further equipped with a counter-balancing means fixedly attached to the other end of said pivoting means, said latch releasing counter-balancing means including a weight adjustably attached to a threaded arm which in turn is fixedly attached to said other end of said pivoting means and which rotates upwardly when said trapping compartment and said latch pin from said horizontal position move downwardly in a vertical arc when said trapping compartment is activated by said entering victim, said counter-balancing means is provided to increase or decrease sensitivity of said latch and said latch-releasing means.

9. An animal trap as set forth in claim 8 further characterized in that said receiving-carrying cage has side walls, end walls, top and bottom, with the back end wall having a slidable door removably mounted thereto, the one of said sides of said receiving-carrying cage adjacent to said casing when said casing and said receiving-carrying cage are removably locked together is made of wire mesh with metal framing and has a recessed enclosure in the upper front portion thereof to provide for the freedom of movement of said arm and said top half of said funnel-shaped projection mounted thereto, said recessed enclosure has guard means to prevent victims entrapped in said receiving-carrying cage from disturbing said arm and said top half of said funnel-shaped extension of said exit opening in said casing when said trapping compartment, said latch means and said latch-releasing means are in their horizontally set positions, said recessed enclosure in said receiving-carrying cage has a horizontal bottom wall, a door made of wire mesh hingedly mounted to said bottom wall of said recessed enclosure and held closed by an expansion spring, a chain attached to the top edge of said door and extending outwardly through an opening in said receiving-carrying cage for opening said door against the bias of said spring, and means to releasably hold said door in open position.

10. An animal trap as set forth in claim 9 further characterized in that said casing and receiving-carrying cage are removably locked together by two metal strips of right angle configuration fixedly attached to said bottom of said casing adjacent to said receiving-carrying cage, free ends of said strips being inserted into matching openings in said bottom of said receiving-carrying cage, a pin fixedly mounted on said side wall of said casing adjacent to said receiving-carrying cage and a matching opening to receive said pin in said side wall of said receiving-carrying cage, and a locking hinge fixedly mounted on said top of said casing and extending across a corresponding section of said top of said receiving-carrying cage, said hinge having a free end bent downwardly at a right angle to engage an outside edge of said receiving-carrying cage to removably hold said casing and said receiving-carrying cage together.

References Cited
UNITED STATES PATENTS

| | | | |
|---|---|---|---|
| 754,891 | 3/1904 | Ray | 43—6' |
| 784,453 | 3/1905 | Voelkerding | 43—6! |
| 1,061,477 | 5/1913 | Hildreth | 43—7( |
| 1,355,034 | 10/1920 | Clifton | 43—7( |
| 1,769,453 | 7/1930 | Parratt | 43—7( |

WARNER H. CAMP, *Primary Examiner.*

U.S. Cl. X.R.

43—68